US011130512B1

(12) United States Patent
Mayo, IV et al.

(10) Patent No.: US 11,130,512 B1
(45) Date of Patent: Sep. 28, 2021

(54) WORKPLACE SUPPORT RACK AND TABLE

(71) Applicants: Irving Mayo, IV, Smithfield, VA (US); Teresa Mayo, Smithfield, VA (US)

(72) Inventors: Irving Mayo, IV, Smithfield, VA (US); Teresa Mayo, Smithfield, VA (US)

(*) Notice: Subject to any disclaimer, the term of this patent is extended or adjusted under 35 U.S.C. 154(b) by 276 days.

(21) Appl. No.: 16/385,155

(22) Filed: Apr. 16, 2019

(51) Int. Cl.
| | |
|---|---|
| *A47B 97/04* | (2006.01) |
| *B62B 3/08* | (2006.01) |
| *B62B 3/02* | (2006.01) |
| *B62B 5/04* | (2006.01) |

(52) U.S. Cl.
CPC ............... *B62B 3/08* (2013.01); *B62B 3/025* (2013.01); *B62B 5/04* (2013.01); *B62B 2203/07* (2013.01); *B62B 2206/006* (2013.01)

(58) Field of Classification Search
CPC .. B62B 3/08; B62B 5/04; B62B 3/025; B62B 2206/006; B62B 2203/07; A47B 41/02; A47B 19/08; A47B 41/04; A47B 85/02; A47B 97/04; A47B 27/00; A47B 27/14
See application file for complete search history.

(56) References Cited

U.S. PATENT DOCUMENTS

| | | | | |
|---|---|---|---|---|
| 243,407 A | * | 6/1881 | Shedlock | A47B 97/08 248/465 |
| 284,251 A | * | 9/1883 | Smillie | A47B 41/02 434/419 |
| 353,719 A | * | 12/1886 | Turner | A47B 97/08 248/464 |
| 439,186 A | * | 10/1890 | Reams | A47B 27/02 108/9 |
| 1,531,045 A | * | 3/1925 | Swaisgood | A47B 27/14 108/10 |
| 1,792,993 A | * | 2/1931 | Lochner | A47B 85/02 108/8 |
| 2,244,036 A | * | 6/1941 | Williman | A47B 85/02 108/9 |
| 2,579,740 A | * | 12/1951 | Hiemenz | A47B 23/00 248/455 |
| 2,607,646 A | * | 8/1952 | Westeamp | A47B 85/02 108/1 |
| 2,837,391 A | * | 6/1958 | Clark | A47B 41/04 108/6 |
| 3,064,989 A | * | 11/1962 | Bellows | B62B 1/002 280/641 |
| 3,514,173 A | * | 5/1970 | Ford | B44D 3/04 312/231 |
| 3,605,650 A | * | 9/1971 | Hebel et al. | A47B 85/02 108/9 |

(Continued)

FOREIGN PATENT DOCUMENTS

| | | | | |
|---|---|---|---|---|
| DE | 19951695 A1 | * | 5/2001 | A47B 97/08 |
| EP | 0392817 A2 | * | 10/1990 | A47B 13/08 |

(Continued)

*Primary Examiner* — Jacob B Meyer (57) ABSTRACT

The workplace support rack and table is a rotating easel. The workplace support rack and table is configured to hold a work item at a range of cants from a horizontal plane to an almost vertical surface. The workplace support rack and table collapses for storage. The workplace support rack and table comprises an easel, a pedestal, and a plurality of hinges. The plurality of hinges attach the pedestal to the easel. The plurality of hinges further adjusts the cant of the easel relative to the horizontal plane.

16 Claims, 6 Drawing Sheets

(56) References Cited

U.S. PATENT DOCUMENTS

| | | | | |
|---|---|---|---|---|
| 3,625,504 | A | 12/1971 | Walker | |
| 3,640,228 | A * | 2/1972 | Busse | A47B 9/20 108/6 |
| 3,643,935 | A | 2/1972 | Bell | |
| 3,805,710 | A * | 4/1974 | Leshem | A47B 3/0803 108/6 |
| 3,875,872 | A * | 4/1975 | Kayner | A47B 85/02 108/1 |
| 4,057,215 | A * | 11/1977 | Stettler | A47B 97/08 248/460 |
| 4,109,892 | A * | 8/1978 | Hartung | A47B 97/04 248/449 |
| D256,533 | S | 8/1980 | Alessio | |
| 4,239,197 | A | 12/1980 | Olstad | |
| 4,262,606 | A * | 4/1981 | Hodson | A47B 25/00 108/118 |
| 4,284,286 | A * | 8/1981 | Lewallen | B62B 1/002 280/30 |
| 4,404,914 | A * | 9/1983 | Taylor | A47B 97/08 108/9 |
| 4,714,224 | A * | 12/1987 | Calmes | A47B 97/08 108/10 |
| 4,718,630 | A * | 1/1988 | Richard | A47B 23/007 108/1 |
| 4,856,749 | A * | 8/1989 | Habermann | A47B 97/04 248/448 |
| 4,880,194 | A | 11/1989 | Geise | |
| 5,154,441 | A * | 10/1992 | White | A47B 31/04 108/120 |
| 5,417,168 | A * | 5/1995 | Soper | A47B 3/00 108/124 |
| 5,501,423 | A * | 3/1996 | Roberts | A47B 83/04 248/441.1 |
| 5,725,192 | A * | 3/1998 | Cloninger | A47B 97/04 248/447 |
| 5,868,185 | A | 2/1999 | Poling | |
| 6,170,792 | B1 * | 1/2001 | Miceli | A47B 97/08 248/441.1 |
| 6,267,345 | B1 * | 7/2001 | Turner | A47B 97/04 248/129 |
| 6,302,032 | B1 * | 10/2001 | Ranspach | A47B 97/04 108/12 |
| 6,325,348 | B1 * | 12/2001 | Turner | A47B 97/04 16/266 |
| 6,471,174 | B2 * | 10/2002 | Turner | A47B 97/04 248/444 |
| 6,565,059 | B1 * | 5/2003 | Falconer | A47B 97/00 248/118.3 |
| 6,575,103 | B1 * | 6/2003 | Holdredge | A47B 3/02 108/118 |
| 6,666,424 | B2 * | 12/2003 | Richardson | A47B 97/08 248/447 |
| 6,889,952 | B2 * | 5/2005 | Cook | A47B 97/08 248/448 |
| 6,941,876 | B1 * | 9/2005 | Traino | A47B 19/06 108/50.11 |
| 8,448,956 | B2 * | 5/2013 | Wise | B25H 1/04 280/30 |
| 8,950,343 | B2 * | 2/2015 | Huang | A47B 3/02 108/116 |
| 9,113,709 | B2 * | 8/2015 | Jewett | A47B 97/04 |
| 9,138,051 | B2 * | 9/2015 | Pan | A47B 7/02 |
| 9,221,168 | B2 | 12/2015 | Boyd | |
| 10,343,275 | B2 * | 7/2019 | Bransford | B23D 59/00 |
| 10,426,265 | B2 * | 10/2019 | Li | A47B 85/06 |
| 10,486,458 | B2 * | 11/2019 | O'Connor | B42B 5/08 |
| 2002/0179181 | A1 * | 12/2002 | Murphy | B25H 1/10 144/286.5 |
| 2003/0173488 | A1 * | 9/2003 | Cook | A47B 97/08 248/458 |
| 2005/0145148 | A1 * | 7/2005 | Mason | A47B 41/02 108/130 |
| 2006/0075942 | A1 * | 4/2006 | Tak | A47B 41/02 108/103 |
| 2011/0139042 | A1 * | 6/2011 | Korb | A47B 3/00 108/115 |
| 2013/0019547 | A1 * | 1/2013 | Kim | A47B 41/02 52/173.1 |
| 2015/0223600 | A1 * | 8/2015 | Pan | A47B 41/02 108/91 |
| 2017/0238699 | A1 * | 8/2017 | Vaillancourt | A47B 27/18 |
| 2018/0352957 | A1 * | 12/2018 | Avallon | B43L 1/00 |

FOREIGN PATENT DOCUMENTS

| EP | 0392817 A3 * | 5/1991 | A47B 1/00 |
| WO | 2011107740 | 9/2011 | |

* cited by examiner

WORKPLACE SUPPORT RACK AND TABLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles, more specifically, a miscellaneous furniture item. (A47B97/00)

SUMMARY OF INVENTION

The workplace support rack and table is a rotating easel. The workplace support rack and table is configured to hold a work item at a range of cants from a horizontal plane to an almost vertical surface. The workplace support rack and table collapses for storage. The workplace support rack and table comprises an easel, a pedestal, and a plurality of hinges. The plurality of hinges attach the pedestal to the easel. The plurality of hinges further adjusts the cant of the easel relative to the horizontal plane.

These together with additional objects, features and advantages of the workplace support rack and table will be readily apparent to those of ordinary skill in the art upon reading the following detailed description of the presently preferred, but nonetheless illustrative, embodiments when taken in conjunction with the accompanying drawings.

In this respect, before explaining the current embodiments of the workplace support rack and table in detail, it is to be understood that the workplace support rack and table is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the workplace support rack and table.

It is therefore important that the claims be regarded as including such equivalent construction insofar as they do not depart from the spirit and scope of the workplace support rack and table. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
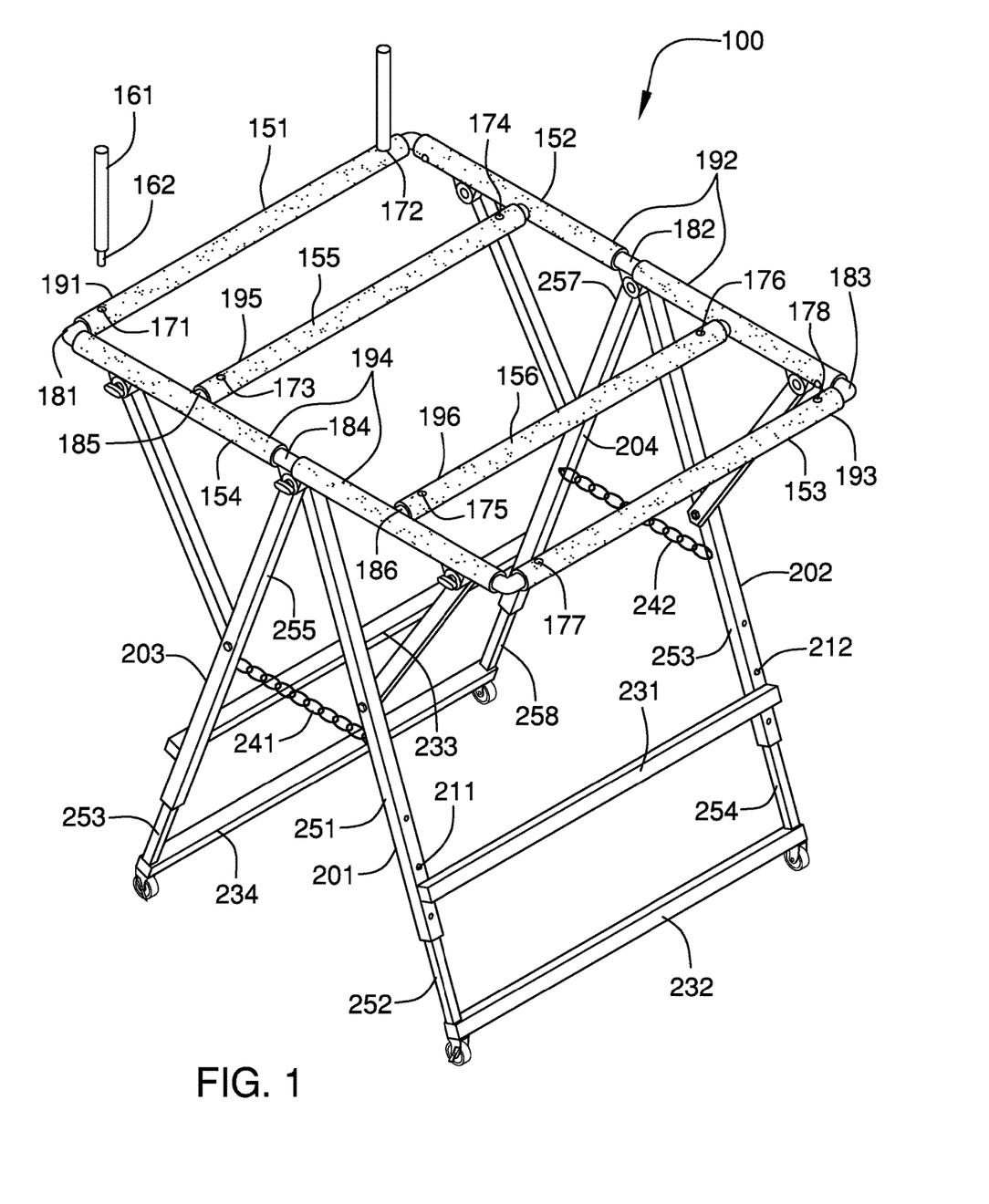
FIG. 1 is a perspective view of an embodiment of the disclosure.
Figure 2:
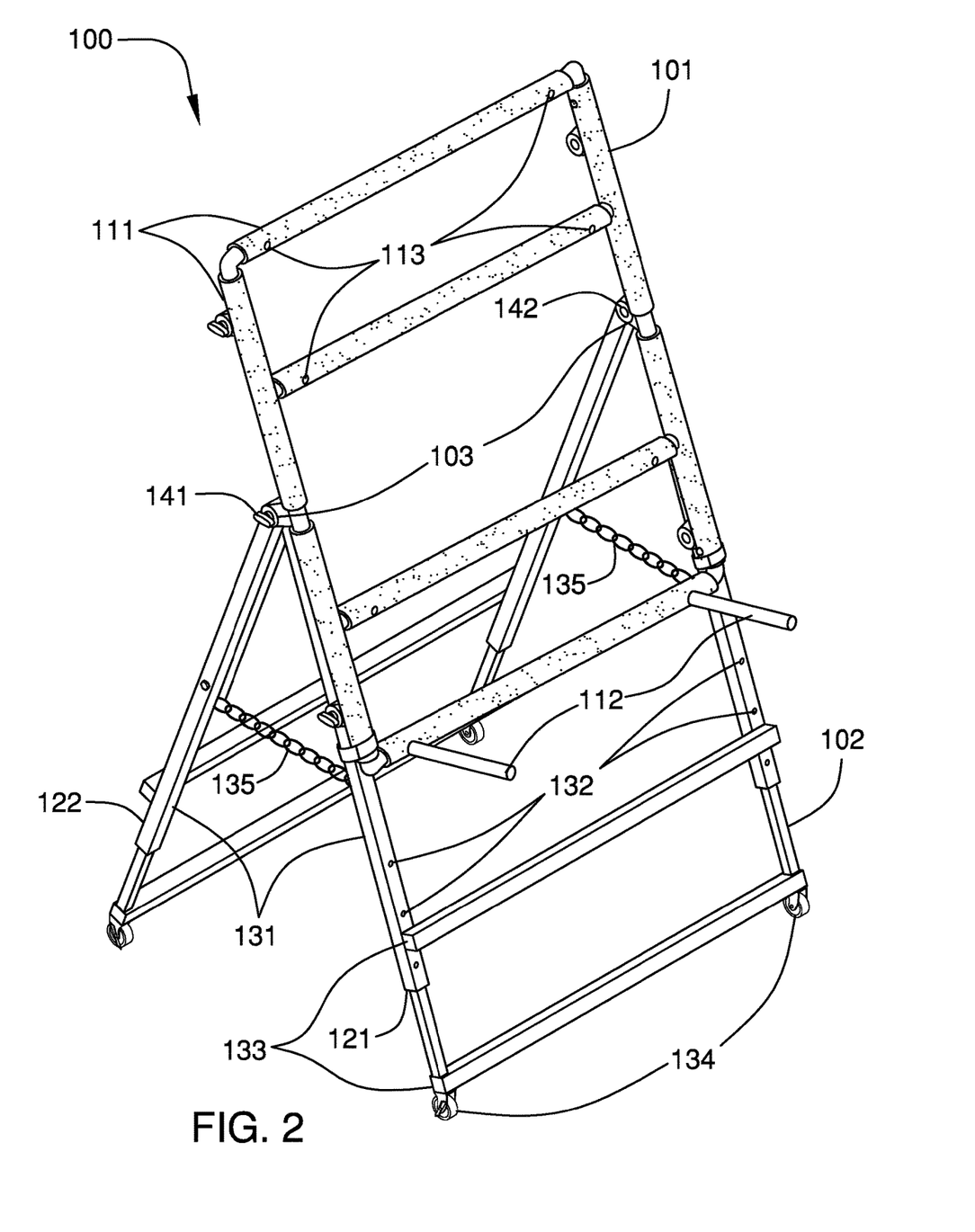
FIG. 2 is a perspective view of an embodiment of the disclosure.
Figure 3:
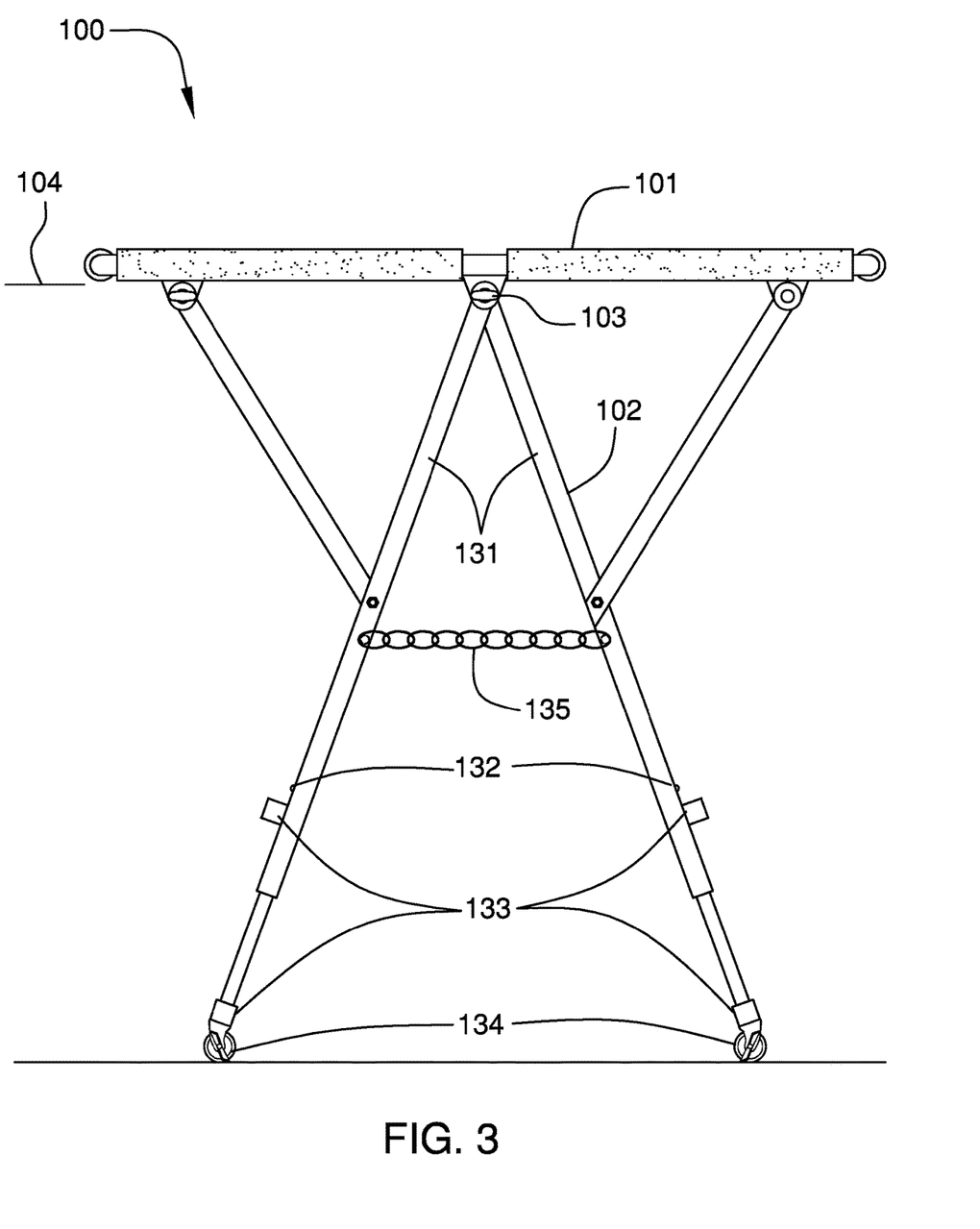
FIG. 3 is a side view of an embodiment of the disclosure.
Figure 4:
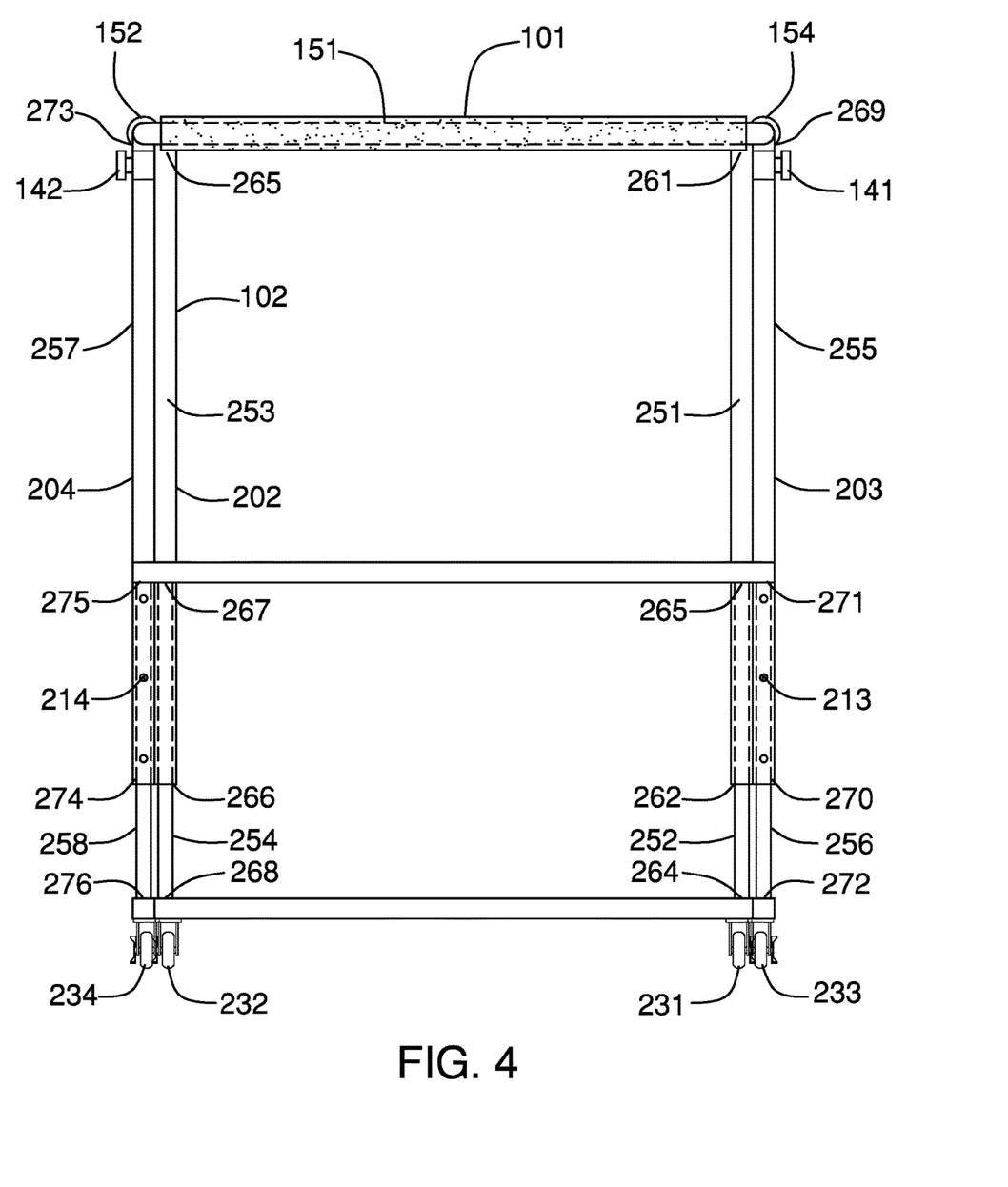
FIG. 4 is a front view of an embodiment of the disclosure.
Figure 5:
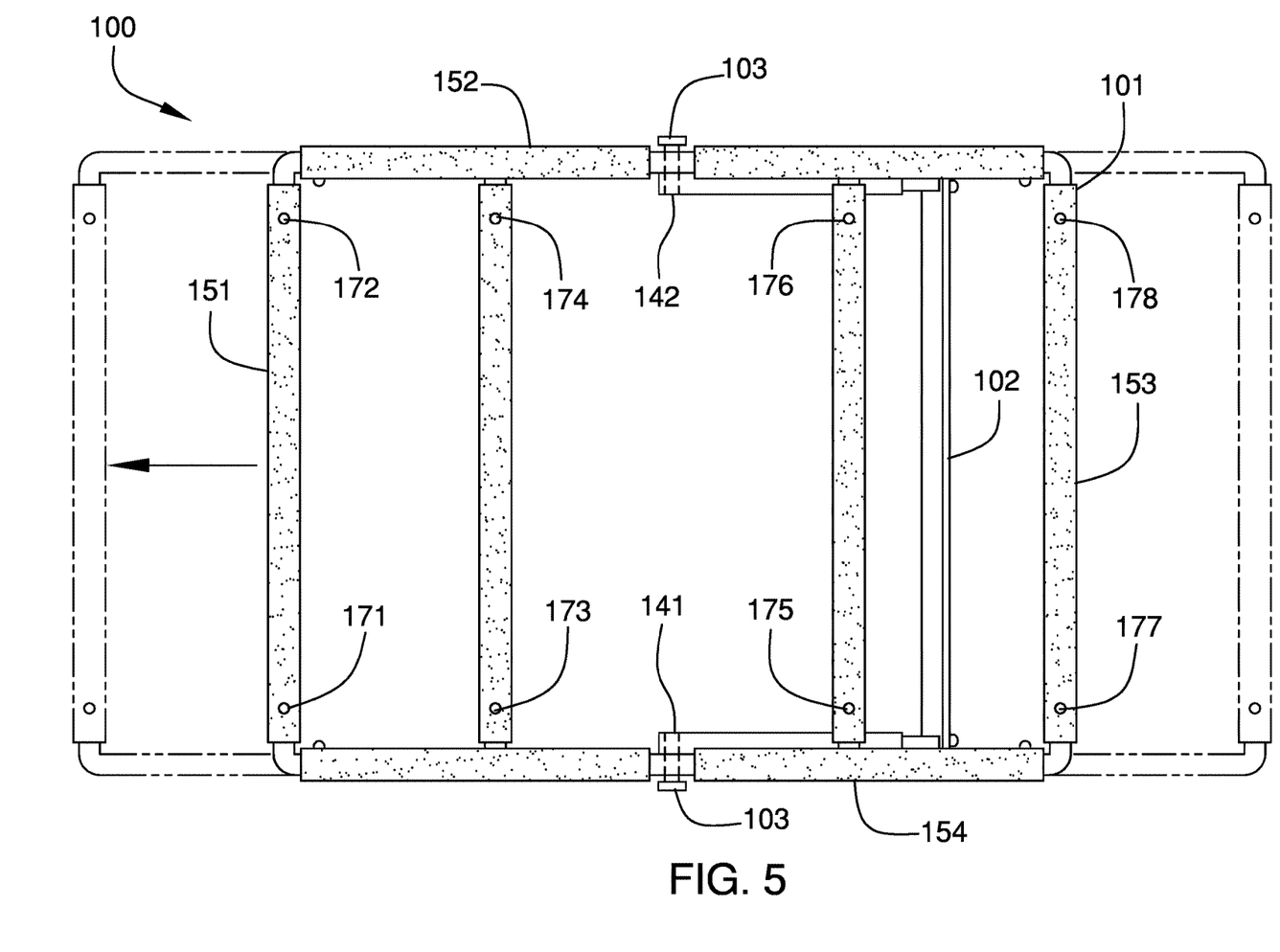
FIG. 5 is a top view of an embodiment of the disclosure.
Figure 6:
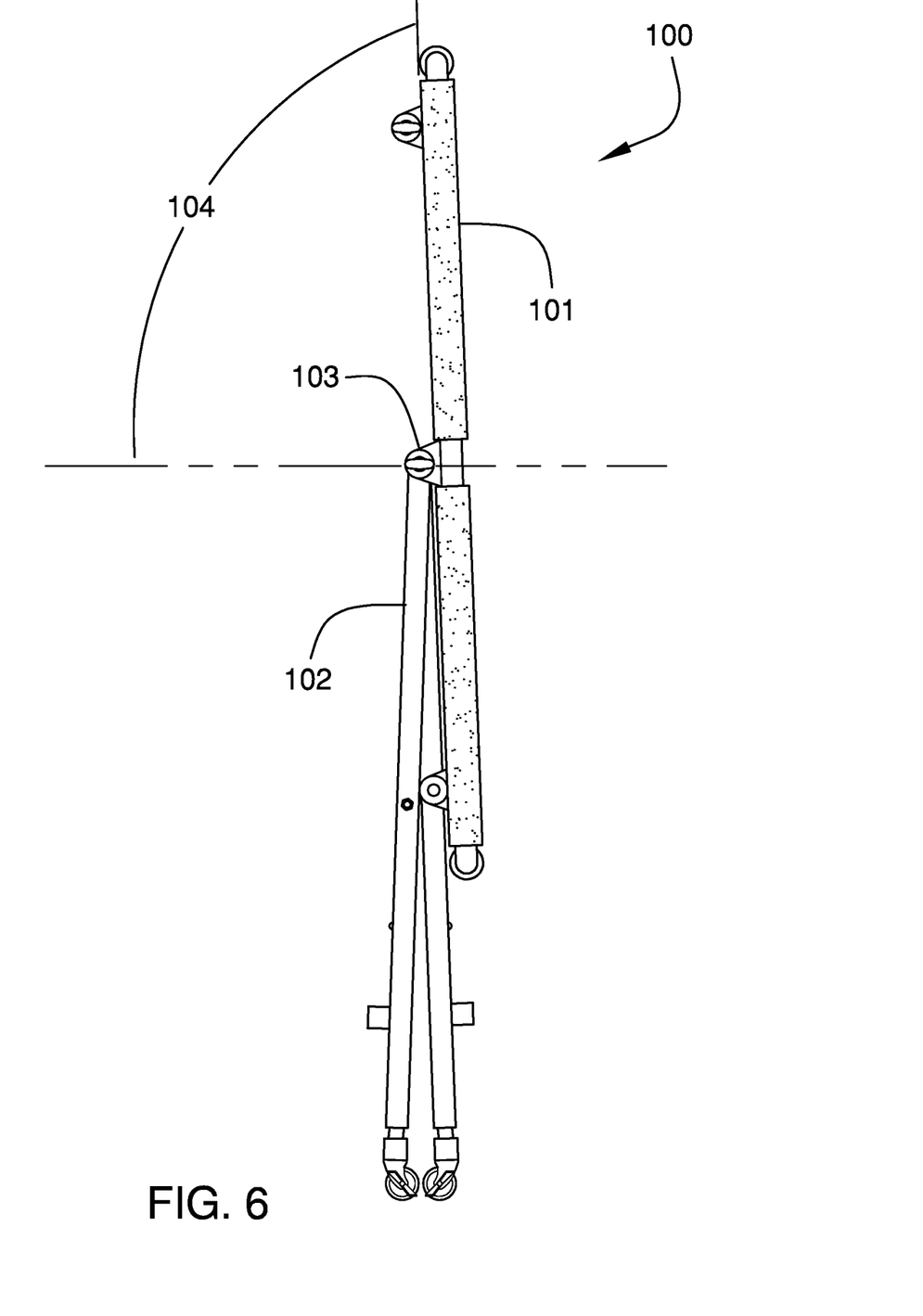
FIG. 6 is a collapsed view of an embodiment of the disclosure.

Detailed reference will now be made to one or more potential embodiments of the disclosure, which are illustrated in FIGS. 1 through 6.

The workplace support rack and table 100 (hereinafter invention) is a rotating easel 101. The invention 100 is configured to hold a work item at a range of cants 104 from a horizontal plane to an almost vertical surface. The invention 100 collapses for storage. The invention 100 comprises an easel 101, a pedestal 102, and a plurality of hinges 103. The plurality of hinges 103 attach the pedestal 102 to the easel 101. The plurality of hinges 103 further adjusts the cant 104 of the easel 101 relative to the horizontal plane.

The easel 101 is an openwork structure. The easel 101 forms a supporting surface used as a table type workbench. The easel 101 is a rotating structure. The easel 101 rotates such that the cant 104 of the supporting surface is adjustable. The cant 104 is defined as the angle between a horizontal reference and the plane of the working surface formed by the easel 101. The easel 101 comprises a plurality of struts 111, a plurality of pegs 112, and a plurality of peg holes 113.

Each of the plurality of struts 111 is a prism-shaped structure. The end shape of each of the plurality of struts 111 is geometrically identical. Each of the plurality of struts 111 forms a shaft. The plurality of struts 111 are assembled to form the openwork structure of the easel 101. The plurality of struts 111 comprises a first strut 151, a second strut 152, a third strut 153, a fourth strut 154, a fifth strut 155, and a sixth strut 156.

The first strut 151 comprises a first prism-shaped tube 181 and a first cushion 191. The first prism-shaped tube 181 is a rigid prism-shaped structure. The first cushion 191 is a padded material that covers the first prism-shaped tube 181 such that the first prism-shaped tube 181 will not damage work placed on the easel 101.

The second strut 152 comprises a second prism-shaped tube 182 and a second cushion 192. The second prism-shaped tube 182 is a rigid prism-shaped structure. The second cushion 192 is a padded material that covers the second prism-shaped tube 182 such that the second prism-shaped tube 182 will not damage work placed on the easel 101.

The third strut 153 comprises a third prism-shaped tube 183 and a third cushion 193. The third prism-shaped tube 183 is a rigid prism-shaped structure. The third cushion 193 is a padded material that covers the third prism-shaped tube 183 such that the third prism-shaped tube 183 will not damage work placed on the easel 101.

The fourth strut 154 comprises a fourth prism-shaped tube 184 and a fourth cushion 194. The fourth prism-shaped tube 184 is a rigid prism-shaped structure. The fourth cushion 194 is a padded material that covers the fourth prism-shaped tube 184 such that the fourth prism-shaped tube 184 will not damage work placed on the easel 101.

The fifth strut 155 comprises a fifth prism-shaped tube 185 and a fifth cushion 195. The fifth prism-shaped tube 185 is a rigid prism-shaped structure. The fifth cushion 195 is a padded material that covers the fifth prism-shaped tube 185 such that the fifth prism-shaped tube 185 will not damage work placed on the easel 101.

The sixth strut 156 comprises a sixth prism-shaped tube 186 and a sixth cushion 196. The sixth prism-shaped tube 186 is a rigid prism-shaped structure. The sixth cushion 196 is a padded material that covers the sixth prism-shaped tube 186 such that the sixth prism-shaped tube 186 will not damage work placed on the easel 101.

The second strut 152 is the strut selected from the plurality of struts 111 that has the center axis with the greatest span of length. The fourth strut 154 is the strut selected from the plurality of struts 111 that is distal from the second strut 152. The span of the length of the center axis of the fourth strut 154 equals the span of the length of the center axis of the second strut 152.

The sixth strut 156 is the strut selected from the plurality of struts 111 that has the center axis with the least span of length. The span of the length of the center axis of the fifth strut 155 equals the span of the length of the center axis of the sixth strut 156. The first strut 151 is a strut selected from the plurality of struts 111 that has a center axis with a span of length that is equal to or greater than the span of the length of the center axis of the sixth strut 156. The span of the length of the center axis of the third strut 153 equals the span of the length of the center axis of the first strut 151.

The fourth strut 154 is distal from the second strut 152. The third strut 153 is distal from the first strut 151. The center axes of the first strut 151, the third strut 153, the fifth strut 155, and the sixth strut 156 are parallel.

Each of the plurality of pegs 112 is a composite prism structure. Each of the plurality of pegs 112 attaches to a strut selected from the plurality of struts 111. Each of the plurality of pegs 112 projects perpendicularly away from the selected strut. The plurality of pegs 112 form barriers that contain objects placed on the easel 101 within the perimeter of the easel 101. Each individual peg selected from the plurality of pegs 112 comprises a main prism 161 and a prism ferrule 162. Each individual peg selected from the plurality of pegs 112 is identical.

The main prism 161 is a prism-shaped shaft. The main prism 161 forms the barrier structure of each of the plurality of pegs 112. The prism ferrule 162 is a prism-shaped structure that is geometrically similar to the prism structure of the main prism 161. The prism ferrule 162 forms a tenon that inserts into a peg hole selected from the plurality of peg holes 113. The prism ferrule 162 is geometrically similar to any peg hole selected from the plurality of peg holes 113.

Each of the plurality of peg holes 113 is a hole formed within a strut selected from the plurality of struts 111. Each of the plurality of peg holes 113 receives a peg selected from the plurality of pegs 112. The selected peg attaches to the peg hole selected from the plurality of peg holes 113 in the manner of a mortise and tenon. Specifically, each peg hole selected from the plurality of peg holes 113 is sized to receive a prism ferrule 162 of a peg selected from the plurality of pegs 112. The plurality of peg holes 113 comprises a first peg hole 171, a second peg hole 172, a third peg hole 173, a fourth peg hole 174, a fifth peg hole 175, a sixth peg hole 176, a seventh peg hole 177, and an eighth peg hole 178.

The first peg hole 171 is a negative space formed in the first strut 151. The second peg hole 172 is a negative space formed in the first strut 151. The third peg hole 173 is a negative space formed in the fifth strut 155. The fourth peg hole 174 is a negative space formed in the fifth strut 155. The fifth peg hole 175 is a negative space formed in the sixth strut 156. The sixth peg hole 176 is a negative space formed in the sixth strut 156. The seventh peg hole 177 is a negative space formed in the third strut 153. The eighth peg hole 178 is a negative space formed in the third strut 153.

The pedestal 102 is a framework that transfers the load path of the easel 101 to a supporting surface. The pedestal 102 forms a triangular prism structure. The pedestal 102 adjusts the elevation of the easel 101 above the supporting surface. The pedestal 102 is collapsible such that the volume of space of the pedestal 102 reduces for storage when the invention 100 is not in use. The pedestal 102 comprises a plurality of telescopic legs 131, a plurality of detents 132, a plurality of cross braces 133, a plurality of casters 134, and a plurality of retaining cords 135.

Each of the plurality of telescopic legs 131 is an extension apparatus. Each of the plurality of telescopic legs 131 forms a portion of the load path of pedestal 102. Each of the plurality of telescopic legs 131 forms a composite prism structure. Each of the plurality of telescopic legs 131 is a telescopic structure. The span of the length of the center axis of each of the plurality of telescopic legs 131 is adjustable. The plurality of telescopic legs 131 comprises a first telescopic leg 201, a second telescopic leg 202, a third telescopic leg 203, and a fourth telescopic leg 204.

Each of the plurality of detents 132 is a detent. Each of the plurality of detents 132 are identical. Each of the plurality of detents 132 has a one to one correspondence with a telescopic structure selected from the plurality of telescopic legs 131. Each detent selected from the plurality of detents 132 locks the span of the length of the center axis of the associated telescopic structure selected from the plurality of telescopic legs 131 into a fixed position. The plurality of detents 132 comprises a first detent 211, a second detent 212, a third detent 213, and a fourth detent 214.

The first telescopic leg 201 is a telescopic structure that comprises a first arm 251, a second arm 252, and a first detent 211. The first detent 211 attaches the first arm 251 to the second arm 252. The first arm 251 is a hollow prism that is further defined with an inner dimension. The second arm 252 is a hollow prism that is further defined with an outer dimension. The second arm 252 is geometrically similar to the first arm 251. The span of the outer dimension of the second arm 252 is lesser than the span of the inner dimension of the first arm 251 such that the second arm 252 inserts into the first arm 251 in a telescopic fashion. This telescopic arrangement of the first telescopic leg 201 allows the length of the first telescopic leg 201 to adjust by adjusting the relative position of the second arm 252 within the first arm 251.

The position of the second arm 252 relative to the first arm 251 is held in position using the first detent 211. The first detent 211 is a mechanical device that locks and secures the second arm 252 to the first arm 251. The first detent 211 is selected from the group consisting of a cotter pin, a G snap collar, a cam lock collar, a threaded clutch, a split collar lock, and a spring-loaded ball lock.

The second telescopic leg 202 is a telescopic structure that comprises a third arm 253, a fourth arm 254, and a second detent 212. The second detent 212 attaches the third arm 253 to the fourth arm 254. The third arm 253 is a hollow prism that is further defined with an inner dimension. The fourth arm 254 is a hollow prism that is further defined with an outer dimension. The fourth arm 254 is geometrically similar to the third arm 253. The span of the outer dimension of the fourth arm 254 is lesser than the span of the inner dimension of the third arm 253 such that the fourth arm 254 inserts into the third arm 253 in a telescopic fashion. This telescopic arrangement of the second telescopic leg 202 allows the length of the second telescopic leg 202 to adjust by adjusting the relative position of the fourth arm 254 within the third arm 253.

The position of the fourth arm 254 relative to the third arm 253 is held in position using the second detent 212. The second detent 212 is a mechanical device that locks and secures the fourth arm 254 to the third arm 253. The second detent 212 is selected from the group consisting of a cotter pin, a G snap collar, a cam lock collar, a threaded clutch, a split collar lock, and a spring-loaded ball lock.

The third telescopic leg 203 is a telescopic structure that comprises a fifth arm 255, a sixth arm 256, and a third detent 213. The third detent 213 attaches the fifth arm 255 to the sixth arm 256. The fifth arm 255 is a hollow prism that is further defined with an inner dimension. The sixth arm 256 is a hollow prism that is further defined with an outer dimension. The sixth arm 256 is geometrically similar to the fifth arm 255. The span of the outer dimension of the sixth arm 256 is lesser than the span of the inner dimension of the fifth arm 255 such that the sixth arm 256 inserts into the fifth arm 255 in a telescopic fashion. This telescopic arrangement of the third telescopic leg 203 allows the length of the third telescopic leg 203 to adjust by adjusting the relative position of the sixth arm 256 within the fifth arm 255.

The position of the sixth arm 256 relative to the fifth arm 255 is held in position using the third detent 213. The third detent 213 is a mechanical device that locks and secures the sixth arm 256 to the fifth arm 255. The third detent 213 is selected from the group consisting of a cotter pin, a G snap collar, a cam lock collar, a threaded clutch, a split collar lock, and a spring-loaded ball lock.

The fourth telescopic leg 204 is a telescopic structure that comprises a seventh arm 257, an eighth arm 258, and a fourth detent 214. The fourth detent 214 attaches the seventh arm 257 to the eighth arm 258. The seventh arm 257 is a hollow prism that is further defined with an inner dimension. The eighth arm 258 is a hollow prism that is further defined with an outer dimension. The eighth arm 258 is geometrically similar to the seventh arm 257. The span of the outer dimension of the eighth arm 258 is lesser than the span of the inner dimension of the seventh arm 257 such that the eighth arm 258 inserts into the seventh arm 257 in a telescopic fashion. This telescopic arrangement of the fourth telescopic leg 204 allows the length of the fourth telescopic leg 204 to adjust by adjusting the relative position of the eighth arm 258 within the seventh arm 257.

The position of the eighth arm 258 relative to the seventh arm 257 is held in position using the fourth detent 214. The fourth detent 214 is a mechanical device that locks and secures the eighth arm 258 to the seventh arm 257 The fourth detent 214 is selected from the group consisting of a cotter pin, a G snap collar, a cam lock collar, a threaded clutch, a split collar lock, and a spring-loaded ball lock.

The first arm 251 is further defined with a first end 261 and a second end 262. The second arm 252 is further defined with a third end 263 and a fourth end 264. The third arm 253 is further defined with a fifth end 265 and a sixth end 266. The fourth arm 254 is further defined with a seventh end 267 and an eighth end 268. The fifth arm 255 is further defined with a ninth end 269 and a tenth end 270. The sixth arm 256 is further defined with an eleventh end 271 and a twelfth end 272. The seventh arm 257 is further defined with a thirteenth end 273 and a fourteenth end 274. The eighth arm 258 is further defined with a fifteenth end 275 and a sixteenth end 276.

Each of the plurality of cross braces 133 is a prism-shaped shaft. The plurality of cross braces 133 is a brace used to stabilize the pedestal 102. Each cross brace selected from the plurality of cross braces 133 attaches an initial telescopic leg selected from the plurality of telescopic legs 131 to a subsequent telescopic leg selected from the plurality of telescopic legs 131. The plurality of cross braces 133 comprises a first cross brace 221, a second cross brace 222, a third cross brace 223, and a fourth cross brace 224.

The first cross brace 221 is a prism-shaped shaft that attaches the first telescopic leg 201 to the second telescopic leg 202. The second cross brace 222 is a prism-shaped shaft that attaches the first telescopic leg 201 to the second telescopic leg 202. The third cross brace 223 is a prism-shaped shaft that attaches the third telescopic leg 203 to the fourth telescopic leg 204. The fourth cross brace 224 is a prism-shaped shaft that attaches the third telescopic leg 203 to the fourth telescopic leg 204.

Each of the plurality of casters 134 is a commercially available caster. Each of the plurality of casters 134 is identical. Each of the plurality of casters 134 attaches to a telescopic leg selected from the plurality of telescopic legs 131 such that the invention 100 can roll along the supporting surface. The plurality of casters 134 comprises a first caster 231, a second caster 232, a third caster 233, and a fourth caster 234. The first caster 231 is the caster attached to the first telescopic leg 201. The second caster 232 is the caster attached to the second telescopic leg 202. The third caster 233 is the caster attached to the third telescopic leg 203. The fourth caster 234 is the caster attached to the fourth telescopic leg 204.

Each of the plurality of retaining cords 135 is a flexible structure selected from the group consisting of a cord and a chain. Each of the plurality of retaining cords 135 prevents the angle formed between the first frame 121 and the second frame 122 from exceeding a predetermined limit. The plurality of retaining cords 135 limit the overall triangular shape of the triangular prism structure of the pedestal 102. The plurality of retaining cords 135 comprises a first retaining cord 241 and a second retaining cord 242.

The pedestal 102 further comprises a first frame 121 and a second frame 122. The first frame 121 and the second frame 122 form geometrically identical structures.

The first frame 121 is a rectangular structure that transfers half of the load of the easel 101 to the supporting surface. The first frame 121 forms a leg of the triangular prism structure of the pedestal 102. The first frame 121 comprises the first telescopic leg 201, the second telescopic leg 202, the first detent 211, the second detent 212, the first cross brace 221, the second cross brace 222, the first caster 231, and the second caster 232.

The second frame 122 is a rectangular structure that transfers half of the load of the easel 101 to the supporting surface. The second frame 122 forms a leg of the triangular prism structure of the pedestal 102. The second frame 122 comprises the third telescopic leg 203, the fourth telescopic leg 204, the third detent 213, the fourth detent 214, the third cross brace 223, the fourth cross brace 224, the third caster 233, and the fourth caster 234.

The plurality of hinges 103 attach the easel 101 to the pedestal 102. The plurality of hinges 103 allows the easel 101 to rotate relative to the pedestal 102. The plurality of hinges 103 further allows the internal structure of the pedestal 102 to rotate into and out of the collapsed state.

The plurality of hinges 103 comprises a first hinge 141 and a second hinge 142. The first hinge 141 is a locking hinge. The first hinge 141 fixes the relative positions between the first telescopic leg 201, the third telescopic leg 203, and the fourth strut 154. The second hinge 142 is a locking hinge. The second hinge 142 fixes the relative positions between the second telescopic leg 202, the fourth telescopic leg 204, and the second strut 152.

The first retaining cord 241 is the retaining cord selected from the plurality of retaining cords 135 that attaches the first telescopic leg 201 to the third telescopic leg 203. The second retaining cord 242 is the retaining cord selected from the plurality of retaining cords 135 that attaches the second telescopic leg 202 to the fourth telescopic leg 204.

The following four paragraphs describe the assembly of the easel 101.

The first strut 151, the second strut 152, the third strut 153, and the fourth strut 154 are joined to form a rectangular perimeter. The fifth strut 155 perpendicularly attaches to both the second strut 152 to the fourth strut 154 such that the position of the fifth strut 155 is between the first strut 151 and the sixth strut 156. The sixth strut 156 perpendicularly attaches to both the second strut 152 to the fourth strut 154 such that the position of the sixth strut 156 is between the third strut 153 and the fifth strut 155.

The first peg hole 171 is formed in the first strut 151 such that the position of the first peg hole 171 is between the fourth strut 154 and the second peg hole 172. The second peg hole 172 is formed in the first strut 151 such that the position of the second peg hole 172 is between the second strut 152 and the first peg hole 171.

The third peg hole 173 is formed in the fifth strut 155 such that the position of the third peg hole 173 is between the fourth strut 154 and the fourth peg hole 174. The fourth peg hole 174 is formed in the fifth strut 155 such that the position of the fourth peg hole 174 is between the second strut 152 and the third peg hole 173.

The fifth peg hole 175 is formed in the sixth strut 156 such that the position of the fifth peg hole 175 is between the fourth strut 154 and the sixth peg hole 176. The sixth peg hole 176 is formed in the sixth strut 156 such that the position of the sixth peg hole 176 is between the second strut 152 and the fifth peg hole 175.

The seventh peg hole 177 is formed in the third strut 153 such that the position of the seventh peg hole 177 is between the fourth strut 154 and the eighth peg hole 178. The eighth peg hole 178 is formed in the third strut 153 such that the position of the eighth peg hole 178 is between the second strut 152 and the seventh peg hole 177.

The following three paragraphs describe the assembly of the pedestal 102.

The third end 263 of the second arm 252 inserts into the second end 262 of the first arm 251 to form the first telescopic leg 201. The seventh end 267 of the fourth arm 254 inserts into the sixth end 266 of the third arm 253 to form the second telescopic leg 202. The first cross brace 221 attaches the lateral face of the first arm 251 to the lateral face of the third arm 253. The first cross brace 221 is perpendicular to both the first arm 251 and the third arm 253. The second cross brace 222 attaches the lateral face of the fourth end 264 of the second arm 252 to the lateral face of the eighth end 268 of the fourth arm 254. The second cross brace 222 is perpendicular to both the second arm 252 and the fourth arm 254. The first caster 231 attaches to the fourth end 264 of the second arm 252. The second caster 232 attaches to the eighth end 268 of the fourth arm 254.

The eleventh end 271 of the sixth arm 256 inserts into the tenth end 270 of the fifth arm 255 to form the third telescopic leg 203. The fifteenth end 275 of the eighth arm 258 inserts into the fourteenth end 274 of the seventh arm 257 to form the fourth telescopic leg 204. The third cross brace 223 attaches the lateral face of the fifth arm 255 to the lateral face of the seventh arm 257. The third cross brace 223 is perpendicular to both the fifth arm 255 and the seventh arm 257. The fourth cross brace 224 attaches the lateral face of the twelfth end 272 of the sixth arm 256 to the lateral face of the sixteenth end 276 of the eighth arm 258. The fourth cross brace 224 is perpendicular to both the sixth arm 256 and the eighth arm 258. The third caster 233 attaches to the twelfth end 272 of the sixth arm 256. The fourth caster 234 attaches to the sixteenth end 276 of the eighth arm 258.

The first retaining cord 241 attaches the lateral face of the first arm 251 to the lateral face of the fifth arm 255. The second retaining cord 242 attaches the lateral face of the third arm 253 to the lateral face of the seventh arm 257.

The following two paragraphs describe the use of the plurality of hinges 103 to assemble the invention 100.

The first hinge 141 attaches together: a) the first end 261 of the first arm 251; b) the ninth end 269 of the fifth arm 255; and, c) the center of the fourth strut 154. The first hinge 141 assembles the first arm 251, the fifth arm 255, and the fourth strut 154 such that: a) the fifth arm 255 rotates relative to the first arm 251; and, b) the fourth strut 154 rotates relative to both the first arm 251 and the fifth arm 255.

The second hinge 142 attaches together: a) the fifth end 265 of the second arm 253; b) the thirteenth end 273 of the seventh arm 257; and, c) the center of the second strut 152. The second hinge 142 assembles the third arm 253, the seventh arm 257, and the second strut 152 such that: a) the seventh arm 257 rotates relative to the third arm 253; and, b) the second strut 152 rotates relative to both the third arm 253 and the seventh arm 257.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Brace: As used in this disclosure, a brace is a structural element that is used to support or otherwise steady an object.

Cant: As used in this disclosure, a cant is an angular deviation from one or more reference lines (or planes) such as a vertical line (or plane) or a horizontal line (or plane).

Caster: As used in this disclosure, a caster is a wheel that mounts on a swivel that allows the wheel to adjust, or swivel, the direction of rotation of the wheel to the direction of motion desired for the wheel.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chain: As used in this disclosure, a chain is a series of interlinked rings that form a cord-like structure. Like a cord, a chain has tensile strength but is too flexible to provide compressive strength and is not suitable for use in pushing objects. The rings to form a chain are often formed from a metal.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Cushion: As used in this disclosure a cushion is a structure formed from a pad that is used to prevent injury or damage to a person or object.

Detent: As used in this disclosure, a detent is a device for positioning and holding a first object relative to a second object such that the position of the first object relative to the second object is adjustable.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on.

Extension Apparatus: As used in this disclosure, an extension apparatus is a mechanical structure that is used to extend the span of the distance between any two objects or the reach of a first object towards a second object.

Ferrule: As used in this disclosure, a ferrule is a prism-shaped device that attaches to the end of a prism-shaped structure such that the center axis of the prism-shaped device is aligned center axis of the prism-shaped structure. The outer dimension of the prism-shaped device is lesser than the outer dimension of the cylindrical structure.

Framework: As used in this disclosure, a framework refers to the substructure of an object that carries the load path of the object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lock: As used in this disclosure, a lock is a fastening device that secures a rotating mechanical device into a fixed position.

Mortise: As used in this disclosure, a mortise is a prism-shaped negative spaced formed in an object that is designed to receive a geometrically similar object referred to as a tenon.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Openwork: As used in this disclosure, the term open work is used to describe a structure, often a surface, which is formed with openings that allow for visibility and fluid flow through the structure. Wrought work and meshes are forms of openwork.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or a bean bag chair beans.

Pedestal: As used in this disclosure, a pedestal is an intermediary load bearing structure that that transfers a load path between a supporting surface and an object, structure, or load.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder. See Truss Shaft: As used in this disclosure, a shaft is a long, narrow and rigid prism structure that is used as: 1) a structural element of a larger object; or 2) as a grip or lever for a handle. Shafts often have a cylindrical shape.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Telescopic: As used in this disclosure, telescopic is an adjective that describes an object made of sections that fit or slide into each other such that the object can be made longer or shorter by adjusting the relative positions of the sections.

Tenon: As used in this disclosure, a tenon is a prism-shaped structure that fits into a mortise such that the tenon attaches to the mortise. The tenon is geometrically similar to the mortise.

Tube: As used in this disclosure, the term tube is used to describe a rigid hollow prism with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A workbench comprising:
   an easel, a pedestal, and a plurality of hinges;
   wherein the plurality of hinges attach the pedestal to the easel;
   wherein the plurality of hinges adjusts the cant of the easel relative to the horizontal plane;
   wherein the easel is an openwork structure;
   wherein the easel forms a work surface;
   wherein the easel is a rotating structure;
   wherein the easel forms a cant;
   wherein the cant is defined as the angle between a horizontal reference and the plane of the working surface formed by the easel;
   wherein the easel rotates such that the cant is adjustable;
   wherein the pedestal supports the easel;
   wherein the easel comprises a plurality of struts, a plurality of pegs, and a plurality of peg holes;
   wherein each of the plurality of peg holes are formed in the plurality of struts;
   wherein each of the plurality of pegs insert into a peg hole selected from the plurality of peg holes;
   wherein the pedestal is a framework that transfers the load path of the easel to a supporting surface;
   wherein the pedestal forms a triangular prism structure;
   wherein the pedestal adjusts the elevation of the easel;
   wherein the pedestal is collapsible such that the volume of space of the pedestal is adjustable;
   wherein each of the plurality of struts is a prism-shaped structure;
   wherein the end shape of each of the plurality of struts is geometrically identical;
   wherein each of the plurality of struts forms a shaft;
   wherein the plurality of struts are assembled to form the openwork structure of the easel;
   wherein each of the plurality of pegs is a composite prism structure;
   wherein each of the plurality of pegs attaches to a strut selected from the plurality of struts;
   wherein each of the plurality of pegs projects perpendicularly away from the selected strut;
   wherein each individual peg selected from the plurality of pegs is identical.

2. The workbench according to claim 1
   wherein each of the plurality of peg holes is a negative space formed within a strut selected from the plurality of struts;

wherein each of the plurality of peg holes receives a peg selected from the plurality of pegs.

3. The workbench according to claim 2
wherein the plurality of struts comprises a first strut, a second strut, a third strut, a fourth strut, a fifth strut, and a sixth strut;
wherein the first strut comprises a first prism-shaped tube and a first cushion;
wherein the first prism-shaped tube is a rigid prism-shaped structure;
wherein the first cushion is a padded material that covers the first prism-shaped tube such that the first prism-shaped tube will not damage work placed on the easel;
wherein the second strut comprises a second prism-shaped tube and a second cushion;
wherein the second prism-shaped tube is a rigid prism-shaped structure;
wherein the second cushion is a padded material that covers the second prism-shaped tube such that the second prism-shaped tube will not damage work placed on the easel;
wherein the third strut comprises a third prism-shaped tube and a third cushion;
wherein the third prism-shaped tube is a rigid prism-shaped structure;
wherein the third cushion is a padded material that covers the third prism-shaped tube such that the third prism-shaped tube will not damage work placed on the easel;
wherein the fourth strut comprises a fourth prism-shaped tube and a fourth cushion;
wherein the fourth prism-shaped tube is a rigid prism-shaped structure;
wherein the fourth cushion is a padded material that covers the fourth prism-shaped tube such that the fourth prism-shaped tube will not damage work placed on the easel;
wherein the fifth strut comprises a fifth prism-shaped tube and a fifth cushion;
wherein the fifth prism-shaped tube is a rigid prism-shaped structure;
wherein the fifth cushion is a padded material that covers the fifth prism-shaped tube such that the fifth prism-shaped tube will not damage work placed on the easel;
wherein the sixth strut comprises a sixth prism-shaped tube and a sixth cushion;
wherein the sixth prism-shaped tube is a rigid prism-shaped structure;
wherein the sixth cushion is a padded material that covers the sixth prism-shaped tube such that the sixth prism-shaped tube will not damage work placed on the easel.

4. The workbench according to claim 3
wherein the second strut is the strut selected from the plurality of struts that has the center axis with the greatest span of length;
wherein the fourth strut is the strut selected from the plurality of struts that is distal from the second strut;
wherein the span of the length of the center axis of the fourth strut equals the span of the length of the center axis of the second strut;
wherein the sixth strut is the strut selected from the plurality of struts that has the center axis with the least span of length;
wherein the span of the length of the center axis of the fifth strut equals the span of the length of the center axis of the sixth strut;
wherein the first strut is a strut selected from the plurality of struts that has a center axis with a span of length that is equal to or greater than the span of the length of the center axis of the sixth strut;
wherein the span of the length of the center axis of the third strut equals the span of the length of the center axis of the first strut;
wherein the fourth strut is distal from the second strut;
wherein the third strut is distal from the first strut;
wherein the center axes of the first strut, the third strut, the fifth strut, and the sixth strut are parallel.

5. The workbench according to claim 4
wherein each individual peg selected from the plurality of pegs comprises a main prism and a prism ferrule;
wherein the main prism is a prism-shaped shaft;
wherein the prism ferrule is a prism-shaped structure that is geometrically similar to the prism structure of the main prism;
wherein the prism ferrule forms a tenon that inserts into a peg hole selected from the plurality of peg holes;
wherein the prism ferrule is geometrically similar to any peg hole selected from the plurality of peg holes.

6. The workbench according to claim 5
wherein the plurality of peg holes comprises a first peg hole, a second peg hole, a third peg hole, a fourth peg hole, a fifth peg hole, a sixth peg hole, a seventh peg hole, and an eighth peg hole;
wherein the first peg hole is a negative space formed in the first strut;
wherein the second peg hole is a negative space formed in the first strut;
wherein the third peg hole is a negative space formed in the fifth strut;
wherein the fourth peg hole is a negative space formed in the fifth strut;
wherein the fifth peg hole is a negative space formed in the sixth strut;
wherein the sixth peg hole is a negative space formed in the sixth strut;
wherein the seventh peg hole is a negative space formed in the third strut;
wherein the eighth peg hole is a negative space formed in the third strut.

7. The workbench according to claim 6
wherein the pedestal comprises a plurality of telescopic legs, a plurality of detents, a plurality of cross braces, a plurality of casters, and a plurality of retaining cords;
wherein the plurality of telescopic legs, the plurality of detents, the plurality of cross braces, the plurality of casters, and the plurality of retaining cords are interconnected.

8. The workbench according to claim 7
wherein each of the plurality of telescopic legs is an extension apparatus;
wherein each of the plurality of telescopic legs is a telescopic structure;
wherein the span of the length of the center axis of each of the plurality of telescopic legs is adjustable;
wherein each of the plurality of detents is a detent;
wherein each of the plurality of detents are identical;
wherein each of the plurality of detents has a one to one correspondence with a telescopic structure selected from the plurality of telescopic legs;
wherein each detent selected from the plurality of detents locks the span of the length of the center axis of the associated telescopic structure selected from the plurality of telescopic legs into a fixed position;
wherein each of the plurality of cross braces is a prism-shaped shaft;

wherein each cross brace selected from the plurality of cross braces attaches an initial telescopic leg selected from the plurality of telescopic legs to a subsequent telescopic leg selected from the plurality of telescopic legs;

wherein each of the plurality of casters is identical;

wherein each of the plurality of casters attaches to a telescopic leg selected from the plurality of telescopic legs;

wherein each of the plurality of retaining cords is a flexible structure selected from the group consisting of a cord and a chain.

9. The workbench according to claim 8 wherein the plurality of telescopic legs comprises a first telescopic leg, a second telescopic leg, a third telescopic leg, and a fourth telescopic leg;

wherein the plurality of detents comprises a first detent, a second detent, a third detent, and a fourth detent;

wherein the first telescopic leg is a telescopic structure that comprises a first arm, a second arm, and the first detent;

wherein the first detent is a mechanical device that locks and secures the second arm to the first arm;

wherein the first arm is a hollow prism that is further defined with an inner dimension;

wherein the second arm is a hollow prism that is further defined with an outer dimension;

wherein the second arm is geometrically similar to the first arm;

wherein the span of the outer dimension of the second arm is lesser than the span of the inner dimension of the first arm such that the second arm inserts into the first arm;

wherein the second telescopic leg is a telescopic structure that comprises a third arm, a fourth arm, and the second detent;

wherein the second detent is a mechanical device that locks and secures the fourth arm to the third arm;

wherein the third arm is a hollow prism that is further defined with an inner dimension;

wherein the fourth arm is a hollow prism that is further defined with an outer dimension;

wherein the fourth arm is geometrically similar to the third arm;

wherein the span of the outer dimension of the fourth arm is lesser than the span of the inner dimension of the third arm such that the fourth arm inserts into the third arm;

wherein the third telescopic leg is a telescopic structure that comprises a fifth arm, a sixth arm, and the third detent;

wherein the third detent is a mechanical device that locks and secures the sixth arm to the fifth arm;

wherein the fifth arm is a hollow prism that is further defined with an inner dimension;

wherein the sixth arm is a hollow prism that is further defined with an outer dimension;

wherein the sixth arm is geometrically similar to the fifth arm;

wherein the span of the outer dimension of the sixth arm is lesser than the span of the inner dimension of the fifth arm such that the sixth arm inserts into the fifth arm;

wherein the fourth telescopic leg is a telescopic structure that comprises a seventh arm, an eighth arm, and the fourth detent;

wherein the fourth detent is a mechanical device that locks and secures the eighth arm to the seventh arm;

wherein the seventh arm is a hollow prism that is further defined with an inner dimension;

wherein the eighth arm is a hollow prism that is further defined with an outer dimension;

wherein the eighth arm is geometrically similar to the seventh arm;

wherein the span of the outer dimension of the eighth arm is lesser than the span of the inner dimension of the seventh arm such that the eighth arm inserts into the seventh arm;

wherein the first arm is further defined with a first end and a second end;

wherein the second arm is further defined with a third end and a fourth end;

wherein the third arm is further defined with a fifth end and a sixth end;

wherein the fourth arm is further defined with a seventh end and an eighth end;

wherein the fifth arm is further defined with a ninth end and a tenth end;

wherein the sixth arm is further defined with an eleventh end and a twelfth end;

wherein the seventh arm is further defined with a thirteenth end and a fourteenth end;

wherein the eighth arm is further defined with a fifteenth end and a sixteenth end.

10. The workbench according to claim 9 wherein the plurality of cross braces comprises a first cross brace, a second cross brace, a third cross brace, and a fourth cross brace;

wherein the first cross brace is a prism-shaped shaft that attaches the first telescopic leg to the second telescopic leg;

wherein the second cross brace is a prism-shaped shaft that attaches the first telescopic leg to the second telescopic leg;

wherein the third cross brace is a prism-shaped shaft that attaches the third telescopic leg to the fourth telescopic leg;

wherein the fourth cross brace is a prism-shaped shaft that attaches the third telescopic leg to the fourth telescopic leg.

11. The workbench according to claim 10 wherein the plurality of casters comprises a first caster, a second caster, a third caster, and a fourth caster;

wherein the first caster is the caster attached to the first telescopic leg;

wherein the second caster is the caster attached to the second telescopic leg;

wherein the third caster is the caster attached to the third telescopic leg;

wherein the fourth caster is the caster attached to the fourth telescopic leg.

12. The workbench according to claim 11 wherein the plurality of hinges allows the easel to rotate relative to the pedestal;

wherein the plurality of hinges further allows the pedestal to rotate into and out of the collapsed state;

wherein the plurality of hinges comprises a first hinge and a second hinge;

wherein the first hinge is a locking hinge;

wherein the first hinge fixes the relative positions between the first telescopic leg, the third telescopic leg, and the fourth strut;

wherein the second hinge is a locking hinge;

wherein the second hinge fixes the relative positions between the second telescopic leg, the fourth telescopic leg, and the second strut;

wherein the first hinge attaches together: a) the first end of the first arm; b) the ninth end of the fifth arm; and, c) the center of the fourth strut;

wherein the first hinge assembles the first arm, the fifth arm, and the fourth strut such that: a) the fifth arm rotates relative to the first arm; and, b) the fourth strut rotates relative to both the first arm and the fifth arm;

wherein the second hinge attaches together: a) the fifth end of the second arm; b) the thirteenth end of the seventh arm; and, c) the center of the second strut;

wherein the second hinge assembles the third arm, the seventh arm, and the second strut such that: a) the seventh arm rotates relative to the third arm; and, b) the second strut rotates relative to both the third arm and the seventh arm.

13. The workbench according to claim 12
wherein the plurality of retaining cords comprises a first retaining cord and a second retaining cord;
wherein the first retaining cord is the retaining cord selected from the plurality of retaining cords that attaches the first telescopic leg to the third telescopic leg;
wherein the second retaining cord is the retaining cord selected from the plurality of retaining cords that attaches the second telescopic leg to the fourth telescopic leg.

14. The workbench according to claim 13
wherein the first strut, the second strut, the third strut, and the fourth strut are joined to form a rectangular perimeter;
wherein the fifth strut perpendicularly attaches to both the second strut to the fourth strut such that the position of the fifth strut is between the first strut and the sixth strut;
wherein the sixth strut perpendicularly attaches to both the second strut to the fourth strut such that the position of the sixth strut is between the third strut and the fifth strut;
wherein the first peg hole is formed in the first strut such that the position of the first peg hole is between the fourth strut and the second peg hole;
wherein the second peg hole is formed in the first strut such that the position of the second peg hole is between the second strut and the first peg hole;
wherein the third peg hole is formed in the fifth strut such that the position of the third peg hole is between the fourth strut and the fourth peg hole;
wherein the fourth peg hole is formed in the fifth strut such that the position of the fourth peg hole is between the second strut and the third peg hole;
wherein the fifth peg hole is formed in the sixth strut such that the position of the fifth peg hole is between the fourth strut and the sixth peg hole;
wherein the sixth peg hole is formed in the sixth strut such that the position of the sixth peg hole is between the second strut and the fifth peg hole;
wherein the seventh peg hole is formed in the third strut such that the position of the seventh peg hole is between the fourth strut and the eighth peg hole;
wherein the eighth peg hole is formed in the third strut such that the position of the eighth peg hole is between the second strut and the seventh peg hole.

15. The workbench according to claim 14 wherein the third end of the second arm inserts into the second end of the first arm to form the first telescopic leg;
wherein the seventh end of the fourth arm inserts into the sixth end of the third arm to form the second telescopic leg;
wherein the first cross brace attaches the lateral face of the first arm to the lateral face of the third arm;
wherein the first cross brace is perpendicular to both the first arm and the third arm;
wherein the second cross brace attaches the lateral face of the fourth end of the second arm to the lateral face of the eighth end of the fourth arm;
wherein the second cross brace is perpendicular to both the second arm and the fourth arm;
wherein the first caster attaches to the fourth end of the second arm;
wherein the second caster attaches to the eighth end of the fourth arm;
wherein the eleventh end of the sixth arm inserts into the tenth end of the fifth arm to form the third telescopic leg;
wherein the fifteenth end of the eighth arm inserts into the fourteenth end of the seventh arm to form the fourth telescopic leg;
wherein the third cross brace attaches the lateral face of the fifth arm to the lateral face of the seventh arm;
wherein the third cross brace is perpendicular to both the fifth arm and the seventh arm;
wherein the fourth cross brace attaches the lateral face of the twelfth end of the sixth arm to the lateral face of the sixteenth end of the eighth arm;
wherein the fourth cross brace is perpendicular to both the sixth arm and the eighth arm;
wherein the third caster attaches to the twelfth end of the sixth arm;
wherein the fourth caster attaches to the sixteenth end of the eighth arm;
wherein the first retaining cord attaches the lateral face of the first arm to the lateral face of the fifth arm;
wherein the second retaining cord attaches the lateral face of the third arm to the lateral face of the seventh arm.

16. The workbench according to claim 15
wherein the pedestal further comprises a first frame and a second frame;
wherein the first frame and the second frame form geometrically identical structures;
wherein the first frame is a rectangular structure that transfers half of the load of the easel to the supporting surface;
wherein the first frame forms a leg of the triangular prism structure of the pedestal;
wherein the first frame comprises the first telescopic leg, the second telescopic leg, the first detent, the second detent, the first cross brace, the second cross brace, the first caster, and the second caster;
wherein the second frame is a rectangular structure that transfers half of the load of the easel to the supporting surface;
wherein the second frame forms a leg of the triangular prism structure of the pedestal;
wherein the second frame comprises the third telescopic leg, the fourth telescopic leg, the third detent, the fourth detent, the third cross brace, the fourth cross brace, the third caster, and the fourth caster.

* * * * *